US011275379B2

(12) United States Patent
Kizumi

(10) Patent No.: US 11,275,379 B2
(45) Date of Patent: Mar. 15, 2022

(54) VEHICLE CONTROL APPARATUS AND METHOD FOR CONTROLLING AUTOMATED DRIVING VEHICLE

(71) Applicant: HONDA MOTOR CO., LTD., Tokyo (JP)

(72) Inventor: Yuki Kizumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 216 days.

(21) Appl. No.: 16/685,024

(22) Filed: Nov. 15, 2019

(65) Prior Publication Data
US 2020/0081442 A1 Mar. 12, 2020

Related U.S. Application Data

(63) Continuation of application No. PCT/JP2017/020698, filed on Jun. 2, 2017.

(51) Int. Cl.
*G05D 1/02* (2020.01)
*G01C 21/34* (2006.01)
*G05D 1/00* (2006.01)

(52) U.S. Cl.
CPC ............ *G05D 1/0212* (2013.01); *G01C 21/34* (2013.01); *G05D 1/0088* (2013.01); *G05D 2201/0213* (2013.01)

(58) Field of Classification Search
CPC .............. G05D 1/0212; G05D 1/0088; G05D 2201/0213; G05D 1/027; G05D 1/0278;
(Continued)

(56) References Cited

U.S. PATENT DOCUMENTS 6,151,539 A * 11/2000 Bergholz ............. G01S 17/931
701/25
7,233,861 B2 6/2007 Van Buer et al.
(Continued)

FOREIGN PATENT DOCUMENTS

CN 102598083 A 7/2012
CN 103646561 A 3/2014
(Continued)

OTHER PUBLICATIONS

International Search Report for PCT/JP2017/020693 dated Aug. 22, 2017 (partially translated).
(Continued)

*Primary Examiner* — Alexander G Kalinowski
*Assistant Examiner* — Sanjeev Malhotra
(74) *Attorney, Agent, or Firm* — Thomas | Horstemeyer, LLP

(57) ABSTRACT

A vehicle control apparatus for controlling automated driving of a vehicle acquires information relating to a situation in a surrounding area of the vehicle, acquires, for each position, a first value relating to a probability that an object present in the surrounding area will be present at a future point in time, and a second value obtained based on travel data of a predetermined driver based on the information, the second values being specified using a model defined for a portion of regions through which the vehicle travels, and if the vehicle travels through a region for which a model is not defined, the second values being each specified by combining two values acquired using two models defined for two regions sandwiching the position through which the vehicle is traveling, and determines a path on which the vehicle is to move.

9 Claims, 8 Drawing Sheets

(58) Field of Classification Search
CPC .............. G01C 21/34; B60W 30/0956; B60W 2554/00; B60W 2554/80; B60W 2520/10; B60W 2540/18; B60W 30/09; B60W 50/0097; G06K 9/00805; G08Q 1/16; G08G 1/166
USPC ...................... 701/1, 23, 25, 41, 123; 434/69
See application file for complete search history.

(56) References Cited

U.S. PATENT DOCUMENTS

| | | | |
|---|---|---|---|
| 7,487,074 | B2 | 2/2009 | Ohtsu et al. |
| 7,860,813 | B2 | 12/2010 | Wang et al. |
| 8,947,218 | B2 | 2/2015 | Yoshizawa et al. |
| 9,463,797 | B2 | 10/2016 | Damerow et al. |
| 9,767,696 | B2 | 9/2017 | Arndt et al. |
| 9,878,710 | B2 | 1/2018 | Schmuedderich et al. |
| 9,934,688 | B2 | 4/2018 | Olson et al. |
| 10,286,900 | B2 | 5/2019 | Xi et al. |
| 2004/0176936 | A1 | 9/2004 | Ohtsu et al. |
| 2005/0125148 | A1 | 6/2005 | Van Buer et al. |
| 2009/0191513 | A1* | 7/2009 | Wang ............... G09B 9/052 434/69 |
| 2010/0010699 | A1* | 1/2010 | Taguchi ............. G08G 1/167 701/23 |
| 2012/0218093 | A1 | 8/2012 | Yoshizawa et al. |
| 2014/0012469 | A1* | 1/2014 | Kunihiro ............ B62D 6/001 701/41 |
| 2015/0012167 | A1* | 1/2015 | Wolter ............... G05D 1/021 701/23 |
| 2015/0269844 | A1 | 9/2015 | Arndt et al. |
| 2015/0344030 | A1* | 12/2015 | Damerow ......... B60W 30/0956 701/1 |
| 2016/0096525 | A1* | 4/2016 | Harvey ............... B60Q 1/503 701/23 |
| 2016/0325743 | A1* | 11/2016 | Schmudderich ... G06K 9/00771 |
| 2017/0031361 | A1 | 2/2017 | Olson et al. |
| 2017/0297564 | A1 | 10/2017 | Xi et al. |
| 2018/0114442 | A1* | 4/2018 | Minemura .......... B60T 8/17558 |
| 2018/0345957 | A1* | 12/2018 | Ohmura ............... B60W 30/143 |
| 2019/0145788 | A1* | 5/2019 | Fischer .............. G01C 21/3469 701/123 |
| 2019/0213886 | A1* | 7/2019 | Noda .................. G08G 1/0125 |
| 2019/0227561 | A1* | 7/2019 | Hiramatsu ........... G05D 1/0219 |
| 2019/0333386 | A1* | 10/2019 | Horita ..................... G08G 1/16 |
| 2020/0143670 | A1* | 5/2020 | Kitani ................ G06K 9/00805 |

FOREIGN PATENT DOCUMENTS

| | | |
|---|---|---|
| CN | 104260725 A | 1/2015 |
| CN | 104590274 A | 5/2015 |
| CN | 104925055 A | 9/2015 |
| CN | 105574537 A | 5/2016 |
| CN | 105808314 A | 7/2016 |
| CN | 105892471 A | 8/2016 |
| JP | H11-337643 A | 12/1999 |
| JP | 2006-154967 A | 6/2006 |
| JP | 2009-176288 A | 8/2009 |
| JP | 2015-228204 A | 12/2015 |
| JP | 2016-212872 A | 12/2016 |
| WO | 2018/220851 A1 | 12/2018 |
| WO | 2018/220853 A1 | 12/2018 |

OTHER PUBLICATIONS

International Search Report for PCT/JP2017/020698 dated Aug. 15, 2017 (partially translated).
Office Action for U.S. Appl. No. 16/685,020 dated Oct. 27, 2021.
Kuderer et al., Learning Driving Styles for Autonomous Vehicles from Demonstration, May 2015, 2015 IEEE International Conference on Robotics and Automation (ICRA), Washington State Convention Center, Seattle, Washington.
Chinese Office Action for Chinese Patent Application No. 201780091031.4 dated Jul. 22, 2021 (partially translated).

* cited by examiner

VEHICLE CONTROL APPARATUS AND METHOD FOR CONTROLLING AUTOMATED DRIVING VEHICLE

CROSS-REFERENCE TO RELATED APPLICATION

This application is a continuation of International Patent Application No. PCT/JP2017/020698 filed on Jun. 2, 2017, the entire disclosures of which is incorporated herein by reference.

BACKGROUND OF THE INVENTION

Field of the Invention

The present invention is related to a vehicle control apparatus and a method for controlling an automated driving vehicle.

Description of the Related Art

Automated driving of a vehicle is realized using steering control in which a surrounding environment of the vehicle is recognized, a path for the vehicle to follow is determined based on the recognition result, and the vehicle is caused to actually travel along the path. Here, when the path is being determined, positions of moving objects and still objects on or around the road are specified, predicted positions at one or more future points in time of the moving objects are estimated, and the positions at which the vehicle is to be present at those future points in time are determined based on the specification and estimation results. For example, the positions at which the vehicle is to be present are determined such that the vehicle is present in regions in which the objects are not present at the points in time.

In the determination of the path as described above, if there are many moving objects, for example, the predicted positions of the objects at a certain point in time are distributed in a wide range, and as a result, there are no longer any positions at which the vehicle can be present at that point in time, and the path cannot be established.

SUMMARY OF THE INVENTION

The present invention solves at least this problem, and aims to enable determination of a suitable path according to a situation, in an automated driving vehicle.

A vehicle control apparatus according to an aspect of the present invention is a vehicle control apparatus configured to control automated driving of a vehicle, wherein the vehicle control apparatus is configured to: acquire information relating to a situation in a surrounding area of the vehicle, acquire for each of a plurality of positions, a first value relating to a probability that an object present in the surrounding area will be present at a future point in time, and a second value obtained based on travel data of a predetermined driver based on the information, wherein the second values are specified using a model defined for a portion of regions through which the vehicle travels, and wherein if the vehicle travels through a region for which a model is not defined, the second values are each specified by combining two values acquired using two models defined for two regions sandwiching the position through which the vehicle is traveling, and determine a path on which the vehicle is to move based on combinations of the first values and the second values.

Further features of the present invention will become apparent from the following description of exemplary embodiments (with reference to the attached drawings).

BRIEF DESCRIPTION OF THE DRAWINGS

The attached drawings are included in and constitute a part of the specification, illustrate embodiments of the present invention, and are used together with the description thereof to explain the principle of the present invention.

DESCRIPTION OF THE EMBODIMENTS

Hereinafter, an embodiment of the present invention will be described with reference to the drawings.

Configuration of Vehicle Control Apparatus

Figure 1:
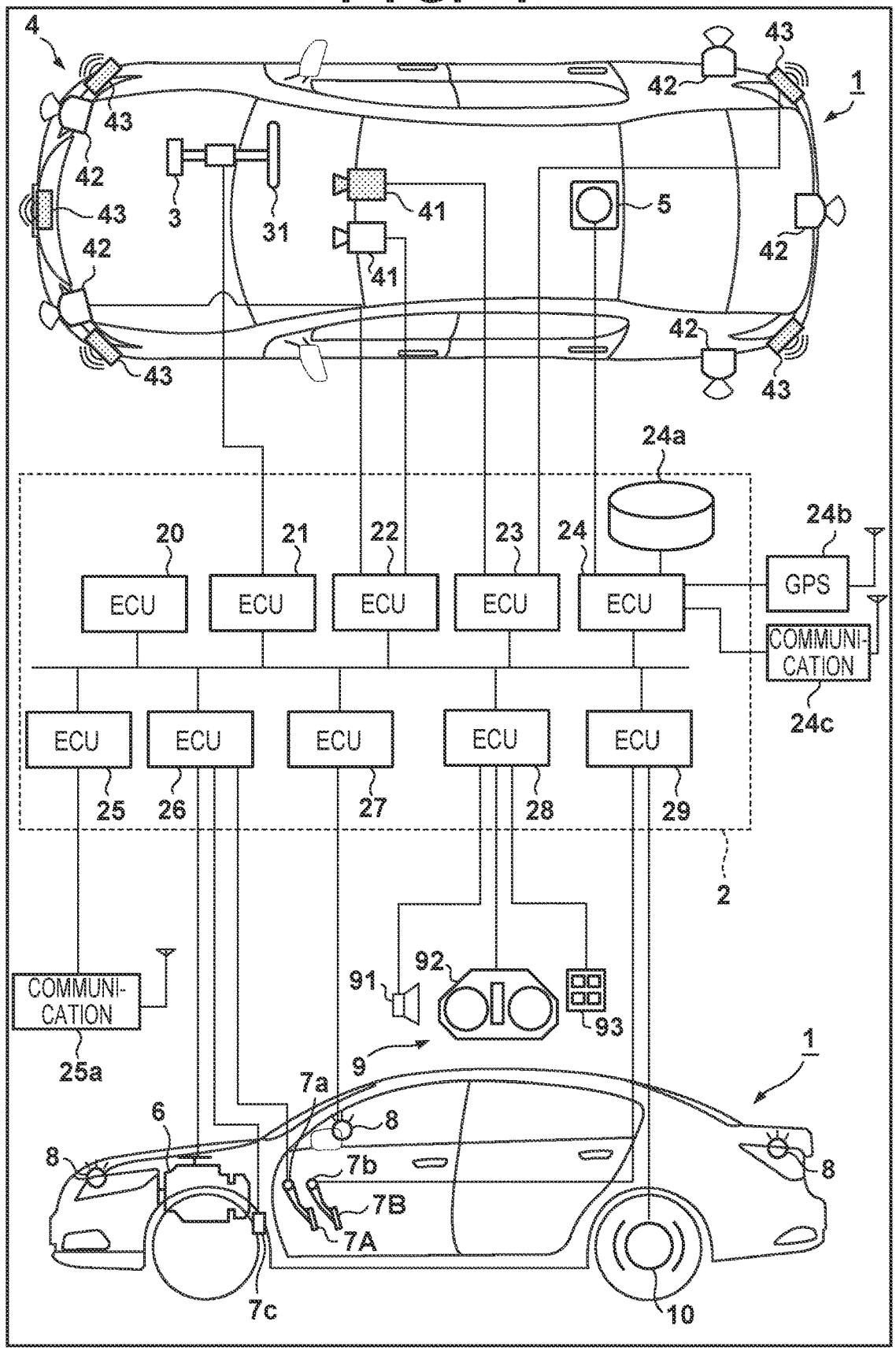
FIG. 1 is a block diagram of a vehicle control apparatus.

FIG. 1 shows a block diagram of a vehicle control apparatus according to the present embodiment, for controlling a vehicle 1. FIG. 1 shows overviews of the vehicle 1 in a plan view and a side view. The vehicle 1 is a sedan-type four-wheel passenger vehicle, in one example.

A control apparatus shown in FIG. 1 includes a control unit 2. The control unit 2 includes multiple ECUs 20 to 29 that are connected through an in-vehicle network so as to be able to communicate. The ECUs (Electronic Control Units) each include: a processor represented by a CPU (Central Processing Unit), a storage device such as a semiconductor memory, an interface with an external device, and the like. The storage device stores programs to be executed by the processor, data to be used by the processor for processing, and the like. Each ECU may also include multiple storage devices, interfaces, and the like.

Hereinafter, functions and the like handled by the ECUs 20 to 29 will be described. Note that the number and functions of the ECUs can be designed as appropriate for the vehicle 1, and more ECUs can be used or some ECUs can be integrated.

The ECU 20 executes control relating to the automated driving of the vehicle 1. In the automated driving, at least one of the steering and the acceleration of the vehicle 1 is automatically controlled.

The ECU 21 controls an electric power steering apparatus 3. The electric power steering apparatus 3 includes a mechanism for steering the front wheels according to a driving operation (steering operation) performed by a driver on a steering wheel 31. Also, the electric power steering apparatus 3 includes a motor that exerts a driving force for assisting the steering operation or automatically steering the front wheels, a sensor for sensing a steering angle, and the like. If the driving state of the vehicle 1 is automated driving, the ECU 21 automatically controls the electric power steering apparatus 3 in correspondence with instructions from the ECU 20 and controls the travel direction of the vehicle 1.

The ECUs 22 and 23 control detection units 41 to 43 for detecting a situation in the surrounding area of the vehicle, and perform information processing on the detection results. The detection units 41 are cameras for shooting a region in front of the vehicle 1 (hereinafter referred to as "cameras 41" in some cases), and two detection units 41 are provided on the front portion of the roof of the vehicle 1, in the case of the present embodiment. Through analysis of an image shot by the camera 41, it is possible to extract outlines of objects and extract division lines (white lines, etc.) of lanes on the road.

The detection units 42 are lidars (laser radars) (hereinafter referred to as "lidars 42" in some cases), and the detection units 42 detect objects in the surrounding area of the vehicle 1 and measure distances to the objects. In the case of the present embodiment, five lidars 42 are provided: one at each corner portion of the front portion of the vehicle 1, one in the center of the rear portion, and one on each side of the rear portion. The detection units 43 are millimeter-wave radars (hereinafter referred to as radars 43 in some cases), and the detection units 43 detect objects in the surrounding area of the vehicle 1 and measure distances to the objects. In the case of the present embodiment, five radars 43 are provided: one in the center of the front portion of the vehicle 1, one at each corner portion on the front portion, and one on each corner portion of the rear portion.

The ECU 22 performs control of one of the cameras 41, and of the lidars 42, and performs information processing of the detection results. The ECU 23 performs control of the other camera 41 and of the radars 43, and performs information processing of the detection results. The reliability of the detection results can be improved by including two sets of apparatuses for detecting a situation in the surrounding area of the vehicle, and multi-faceted analysis of the surrounding environment of the vehicle can be performed by including different types of detection units, such as cameras, lidars, and radars.

The ECU 24 controls a gyrosensor 5, a GPS sensor 24b, and a communication apparatus 24c and performs information processing of detection results or communication results. The gyrosensor 5 detects a turning movement of the vehicle 1. The path of the vehicle 1 can be determined using the detection result of the gyrosensor 5, wheel speeds, and the like. The GPS sensor 24b detects the current position of the vehicle 1. The communication apparatus 24c performs wireless communication with a server that provides map information and traffic information, and the communication apparatus 24c acquires the map information and the traffic information. The ECU 24 can access a database 24a of map information constructed in a storage device, and the ECU 24 performs a search for a route from the current location to a destination, and the like.

The ECU 25 includes a communication apparatus 25a for inter-vehicle communication. The communication apparatus 25a performs wireless communication with other vehicles in the surrounding area, and performs information exchange with the vehicles.

The ECU 26 controls a power plant 6. The power plant 6 is a mechanism that outputs a driving force for rotating driving wheels of the vehicle 1, and for example, includes an engine and a transmission. For example, the ECU 26 controls the output of the engine in correspondence with a driving operation (an accelerator operation or an acceleration operation) that was performed by the driver and detected by an operation detection sensor 7a provided in an acceleration pedal 7A, or the ECU 26 switches the gear ratio of the transmission based on information such as the vehicle speed detected by a vehicle speed sensor 7c. If the driving state of the vehicle 1 is automated driving, the ECU 26 automatically controls the power plant 6 in correspondence with instructions from the ECU 20 and controls the acceleration of the vehicle 1.

The ECU 27 controls lighting devices (head lights, tail lights, etc.) including direction instruction devices 8. In the case of the example shown in FIG. 1, the direction instruction devices 8 are provided on the front portion, the door mirrors, and the rear portion of the vehicle 1.

The ECU 28 controls an input-output apparatus 9. The input-output apparatus 9 performs output of information to the driver and receives input of information from the driver. An audio output apparatus 91 reports information to the driver using audio. A display apparatus 92 reports information to the driver through display of an image. The display apparatus 92 is arranged on the driver's seat surface, for example, and includes an instrument panel and the like. Note that although audio and display are indicated as examples herein, information may also be reported through vibration or light. Also, information may be reported through a combination of any of audio, display, vibration, and light. Furthermore, the combination may be changed or the reporting mode may be changed according to the level (e.g., degree of urgency) of the information to be reported.

An input apparatus 93 is arranged at a position at which it can be operated by the driver, and is a group of switches for performing instruction to the vehicle 1, but an audio input apparatus may also be included therein.

The ECU 29 controls brake apparatuses 10 and a parking brake (not shown). The brake apparatuses 10 are, for example, disk brake apparatuses, are provided in the wheels of the vehicle 1, and decelerate or stop the vehicle 1 by adding resistance to the rotation of the wheels. For example, the ECU 29 controls the operation of the brake apparatuses 10 in correspondence with a driving operation (brake operation) that was performed by the driver and detected by the operation detection sensor 7b provided in the brake pedal 7B. If the driving state of the vehicle 1 is automated driving, the ECU 29 automatically controls the brake apparatuses 10 in correspondence with instructions from the ECU 20 and controls deceleration and stopping of the vehicle 1. The brake apparatuses 10 and the parking brake can also operate in order to maintain the stopped state of the vehicle 1. Also, if the transmission of the power plant 6 includes a parking lock mechanism, the parking lock mechanism can also operate in order to maintain the stopped state of the vehicle 1.

Overview of Processing

In the present embodiment, the ECU 20 executes control relating to automated driving of the vehicle 1. When a destination and automated driving are instructed by the driver, the ECU 20 automatically controls the travel of the vehicle 1 toward the destination in accordance with a guiding route searched for by the ECU 24. During automated driving, the ECU 20 acquires information relating to a situation in the surrounding area of the vehicle 1 from the ECUs 22 and 23, and specifies a path on which the vehicle 1 is to travel in a short period (e.g., 5 seconds) based on the acquired information. The path is specified by determining the position of the vehicle 1 in increments of a predetermined amount of time (e.g., 0.1 seconds). For example, if a path for five seconds is specified in increments of 0.1 seconds, the positions of the vehicle 1 at 50 points in time from 0.1 seconds later to 5.0 seconds later are determined, and a path obtained by connecting those fifty positions is determined as the path on which the vehicle 1 is to travel. Note that "a short period" in this context is a period that is significantly shorter compared to the overall travel of the vehicle 1, and for example, is determined based on the range in which the detection units can detect the surrounding environment, the amount of time needed to brake the vehicle 1, and the like. Also, "a predetermined amount of time" is set to a length according to which the vehicle 1 can adapt to changes in the surrounding environment. The ECU 20 controls the steering, driving, and braking of the vehicle 1 by instructing the ECUs 21, 26, and 29 in accordance with the path specified in this manner.

Figure 2:
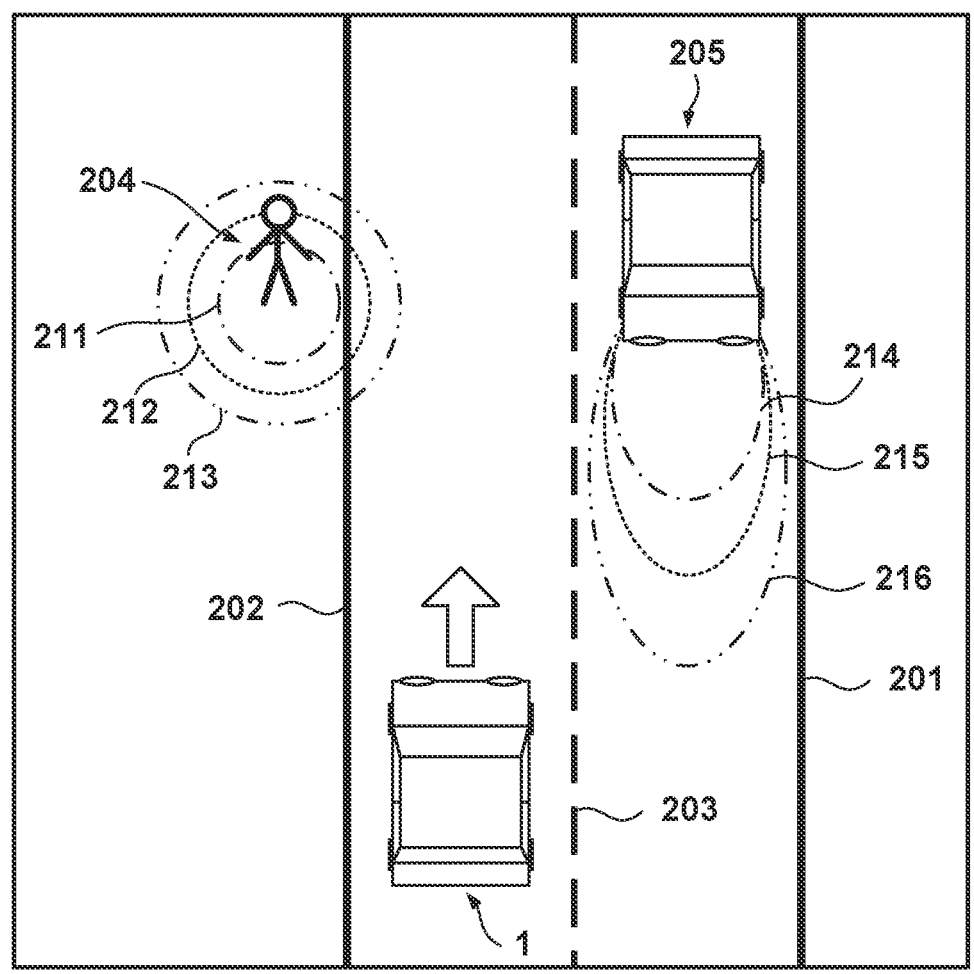
FIG. 2 is a diagram showing an example of ranges in which it is envisioned that moving objects will be present.

Here, specification of the path for a short period of the vehicle 1, which is executed by the ECU 20, will be described. FIG. 2 is a diagram showing a state on and around a road on which the vehicle 1 is traveling at a certain instant, and ranges in which objects are predicted to be present in the future, the ranges being used to predict future states. The vehicle 1 travels (from the lower side to the upper side in FIG. 2) in a left lane divided by a center line 203 in a range in which vehicles can travel, which is indicated by lines 201 and 202 (e.g., lines corresponding to a roadway edge marking, a road shoulder zone, a guard rail, a curbstone, etc.). A pedestrian 204 and another vehicle 205 are present in the travel direction of the vehicle 1. Note that FIG. 2 shows only one other vehicle and one pedestrian for the sake of simplicity, but for example, other traffic participants such as bicycles and two-wheeled vehicles, and non-traffic participants such as obstructions can be present on or around the road. It can also be envisioned that two or more other vehicles and two or more pedestrians are present.

In FIG. 2, the ranges in which it is envisioned that the pedestrian 204 will be present in the future are indicated by a one-dot chain line 211, a dotted line 212, and a two-dot chain line 213, which surround the pedestrian 204. Here, the range of the dotted line 212 is a range in which it is envisioned that the pedestrian 204 will be present at a time after that of the range of the one-dot chain line 211, and similarly, the range of the two-dot chain line 213 is a range in which it is envisioned that the pedestrian 204 will be present at a time after that of the range of the dotted line 212. Note that the probability that the pedestrian 204 will be present in each range can be determined according to a two-dimensional normal distribution centered about the center of a circle, for example. Note that in a situation in which it is difficult for a pedestrian to move toward the road, such as a case in which a guard rail is located near the dividing line 202, for example, the range in which it is envisioned that the pedestrian will be present in the future is not a perfect circle. For example, only the leftward portion or a shape similar thereto, which is obtained by the ranges shown in FIG. 2 being cut off by the line 202, will be the range in which it is envisioned that the pedestrian 204 will be present in the future. Also, since it is envisioned that the pedestrian 204 will move in the direction he or she is facing, according to the direction of the face of the pedestrian 204, the range in which it is envisioned that the pedestrian 204 will be present in the future can be an elliptical shape that is significantly larger in the direction that the pedestrian 204 is facing. Note that the method for estimating the range in which the pedestrian 204 will be present in the future is not limited to this method, and the presence range and presence probability can be estimated using any other method. Also, in all cases, not only is the range determined, but scores corresponding to the probabilities of the pedestrian 204 being present at positions in the range are added, and a first distribution is acquired which indicates that the higher the score is, the higher the probability that the pedestrian 204 will be present at that position is. Note that the ranges need not be explicitly obtained, and it is also possible to only acquire the first distribution.

Similarly, a first distribution for ranges in which it is envisioned that the other vehicle 205 will be present in the future (the ranges indicated by a one-dot chain line 214, a dotted line 215, and a two-dot chain line 216) can also be acquired. Here, the range of the dotted line 215 is a range in which it is envisioned that the other vehicle 205 will be present at a time after that of the range of the one-dot chain line 214, and similarly, the range of the two-dot chain line 216 is a range in which it is envisioned that the other vehicle 205 will be present at a time after that of the range of the dotted line 215. In this manner, upon acquiring the information relating to the situation in the surrounding area of the vehicle 1 from the ECUs 22 and 23, the ECU 20 acquires the first distributions corresponding to the probabilities of the locations at which the moving objects will be present in the future, by executing predetermined processing, for example, based on the acquired information.

A still object does not move and therefore has no variation over time, but since it is envisioned that the object also will not disappear, a first distribution is specified in which the position at which the object is present is the same at each point in time. For example, if a guard rail or a curbstone is arranged along the line 202, a first distribution in which the range in which object is present has a form extending along the line 202 is specified as the first distribution for the guard rail or the curbstone. The ECU 20 acquires a value obtained by adding together the first distributions of the objects at each position as a total first distribution.

In one example, the ECU 20 specifies the regions in which the objects will not be present at each point in time and determines the path such that the vehicle 1 travels through those positions. Doing this makes it possible to select a path such that the vehicle 1 does not interfere with the objects. Note that for a still object such as a guard rail or a curbstone, for example, a range relating to a first distribution may also be determined so as to include a range that is a certain distance away from the actual position of the still object toward the road. Accordingly, it is possible to prevent the vehicle 1 from approaching the still object more than is necessary and thus to prevent a person riding in the vehicle 1 from feeling nervous. On the other hand, with a procedure in which the path of the vehicle 1 is determined in this manner based on the regions in which objects are not present, there is a possibility that in an environment in which many pedestrians are present, for example, there will be no region in which the objects will not be present after a predetermined amount of time, or the region will not be sufficient for arranging the vehicle 1. In this case, the ECU 20 cannot determine the path after a predetermined amount of time, and as a result, the vehicle 1 may stop, and automated driving will not be possible, depending on the case.

In contrast to this, in the present embodiment, the ECU 20 determines the path of the vehicle 1 with further consideration given to data that is a combination of traveling performed by a predetermined driver, for example, in various circumstances, and the situation in the surrounding area of the vehicle 1 detected at this time. For example, the predetermined driver can be an accident-free driver, a taxi driver, a certified driving expert, or the like. For example, the ECU 20 acquires a second distribution relating to how a predetermined driver would travel in a similar situation, or indicating the positions to which the vehicle 1 would be moved if the driver were a predetermined driver. The second distribution is a distribution in which positions to which the predetermined driver is more likely to move the vehicle 1 in the situation of the vehicle 1 have higher values, and positions to which the predetermined driver is less likely to move the vehicle 1 have lower values. Note that the "predetermined driver" in this context can be a professional driver, an excellent driver, or the like, for example. Also, travel data may be collected from many vehicles, and travel data that satisfies a predetermined condition, such as sudden starts, sudden braking, and abrupt steering not being performed, or travel speed being stable, may be extracted from the collected travel data, and may be treated as travel data of a predetermined driver.

Figure 3:
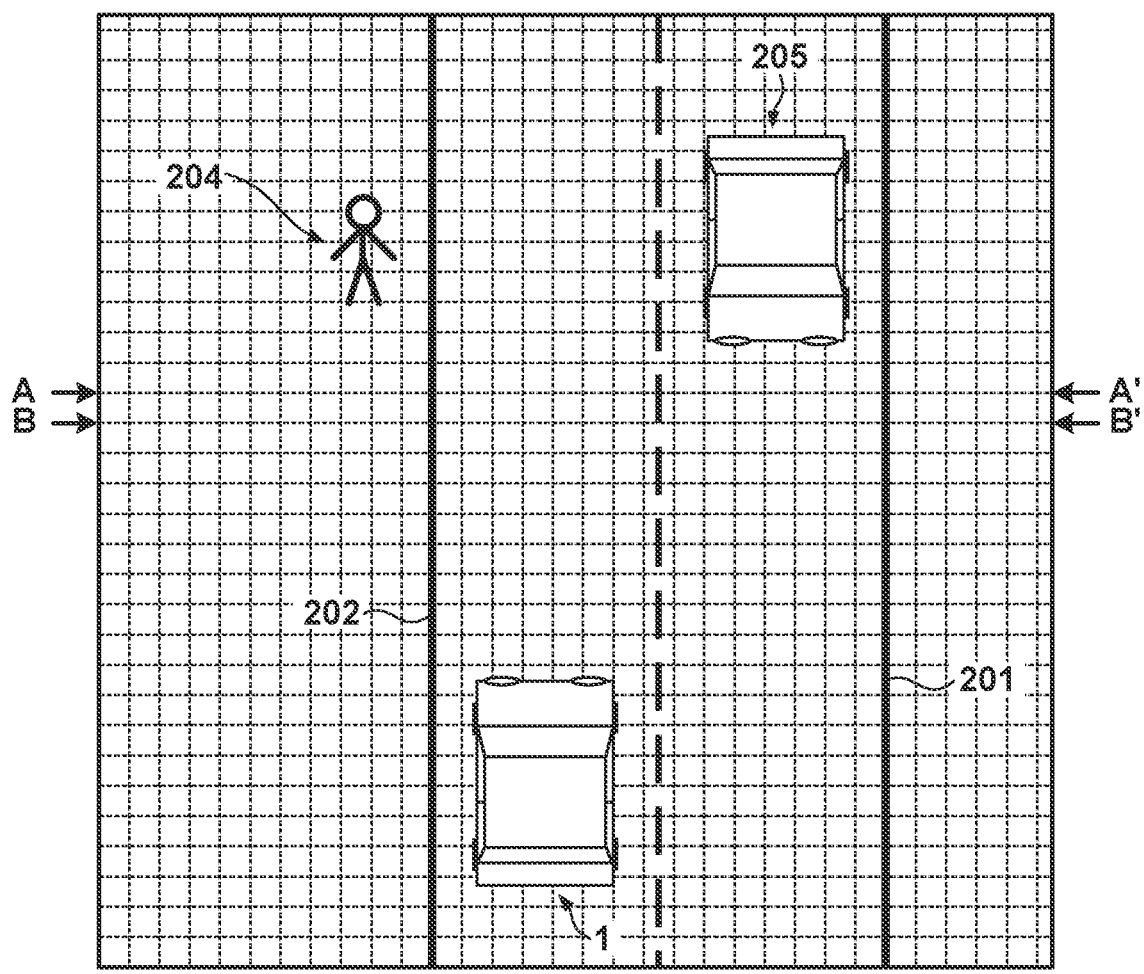
FIG. 3 is a diagram showing an example of positions for calculating values obtained based on travel data of a predetermined driver.

The second distribution is acquired by specifying values for multiple positions included in a certain range around the vehicle 1. For example, as shown in FIG. 3, straight lines in the forward direction and the direction perpendicular thereto are drawn at predetermined intervals in a certain range around the vehicle 1, and the above-described values are specified for each intersection of the straight lines. For example, values are specified for positions corresponding to pixels of an image such as that shown in FIG. 3 (i.e., the intersection points of the grid in FIG. 3 correspond to pixels), which shows information relating to the situation in the surrounding area of the vehicle 1 acquired from the ECUs 22 and 23. Note that FIG. 3 is merely an example, and for example, the above-described values may also be calculated for each intersecting point of multiple circular arcs centered about the vehicle 1 and straight lines drawn radiating from the vehicle 1.

Also, the second distribution is acquired in increments of a predetermined amount of time (e.g., 0.1 seconds) for a short period (e.g., 5 seconds). That is, for example, 50 two-dimensional distributions of values for intersection points of the grid in FIG. 3, which correspond to a 5-second period, are created every 0.1 seconds. At this time, for example, the vehicle 1 cannot move to regions right beside the vehicle 1 at at least the immediately-subsequent point in time (e.g., in 0.1 seconds), and such travel cannot be performed by any predetermined driver, and therefore the above-described values at those positions in these regions will definitely be 0. On the other hand, there is a possibility that the vehicle 1 will be present after the certain period (e.g., in 5 seconds) in a region right beside the vehicle at the current time in some cases due to the predetermined driver performing a reverse operation. For this reason, the above-described value at a position right beside the vehicle 1 after the certain period can be a value that is not 0. Also, in FIG. 3, in the forward direction of the vehicle 1, a pedestrian is present on the left side and another vehicle is present on the right side. For this reason, for example, if the predetermined driver on average drove toward the center line at a distance from a person, the above-described value at the position in the rightward direction increases. On the other hand, if the pedestrian and the other vehicle are far from each other, the above-described value at a position in the direction of moving forward as-is increases. In this manner, a second distribution obtained based on driving performed by a driving expert is specified at multiple points in time and multiple positions.

In one example, many pieces of travel data realized by a predetermined driver in many situations are acquired, and the second distribution is expressed as a distribution of actions actually taken by the predetermined driver in the current situation of the vehicle 1. That is, in travel performed by the predetermined driver in a situation that is completely or mostly the same as the current situation of the vehicle 1, the frequency with which the vehicle was present at each position or the probability that the vehicle was present at each position at each subsequent point in time is acquired as the second distribution. Accordingly, a second distribution is obtained in which a path actually traveled on by a large number of predetermined drivers has a higher value. This second distribution can be particularly useful in a case of driving along a road with few moving objects or the like, for example.

Also, machine learning, in which a combination of the data on the travel path of a vehicle acquired when a predetermined driver actually drove the vehicle and the data on the situation in the surrounding area of the vehicle detected at that time is used as the training data, can be executed, and the result of executing the machine learning can be used to acquire the second distribution. That is, the ECU 20 acquires the second distribution by calculating the above-described values at the positions using, as input, information relating to the situation in the surrounding area of the vehicle 1 acquired from the ECUs 22 and 23, based on the result of performing machine learning using the many pieces of training data acquired in advance from the predetermined driver. Note that a general-purpose algorithm can be used as the algorithm for machine learning, and there is no particular limitation thereto here.

Figure 4:
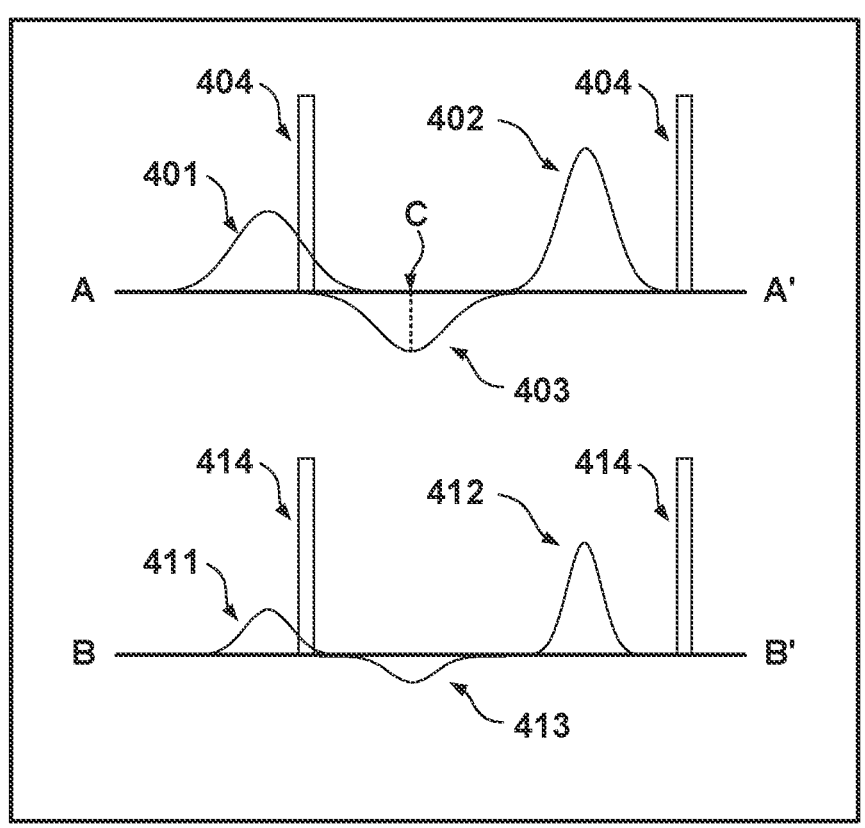
FIG. 4 is a diagram showing an example of relationships between distributions of values relating to objects and values obtained based on travel data of a predetermined driver, and a determined position of a vehicle.

Upon acquiring the second distribution, the ECU 20 calculates the values of the second distribution based on the values of the first distribution at the positions at each point in time, and specifies the positions at which the resulting values are at the minimum or are less than or equal to a predetermined value. FIG. 4 is a diagram showing first distributions and second distributions at positions from A to A' and B to B' in FIG. 3 at a certain point in time, for example. FIG. 4 shows the first distribution on the upper sides of the axes A to A' and B to B' and shows the second distribution on the lower sides of the axes A to A' and B to B'. That is, the first distribution and the second distribution, which has its positive and negative signs reversed, are shown in FIG. 4. In the first distribution, curved lines 401 and 411 are first distributions relating to the pedestrian 204 and curved lines 402 and 412 are first distributions relating to the other vehicle 205. Also, rectangular curved lines 404 and 414 are first distributions relating to still objects, such a curbstone (not shown). Since it is certain that the still object will stay put at its position without moving, a rectangular or mostly rectangular first distribution is formed which has a value that is high at that position and is zero or sufficiently small at other positions. In this manner, the still object and the moving object have first distributions with different edge shapes. For example, the curved lines 403 and 413 indicate second distributions obtained as a result of inputting information relating to the situation in the surrounding area of the vehicle 1 acquired from the ECUs 22 and 23 as arguments into a formula obtained as a result of completing machine learning. The ECU 20 adds the values of the curves 401 to 404 at the positions on the A to A' axis and adds the values of the curves 411 to 414 at the positions on the B to B' axis. Also, the ECU 20 can calculate similar values at positions outside of the A to A' and B to B' axes. In this manner, the ECU 20 calculates values obtained by subtracting the values of the second distributions from the values of the first distributions at each position, and selects the position at which the result is at the minimum (or a position at which the result is less than or equal to a threshold value, depending on the case). In the example shown in FIG. 4, the ECU 20 selects a position C as an example.

Figure 5:
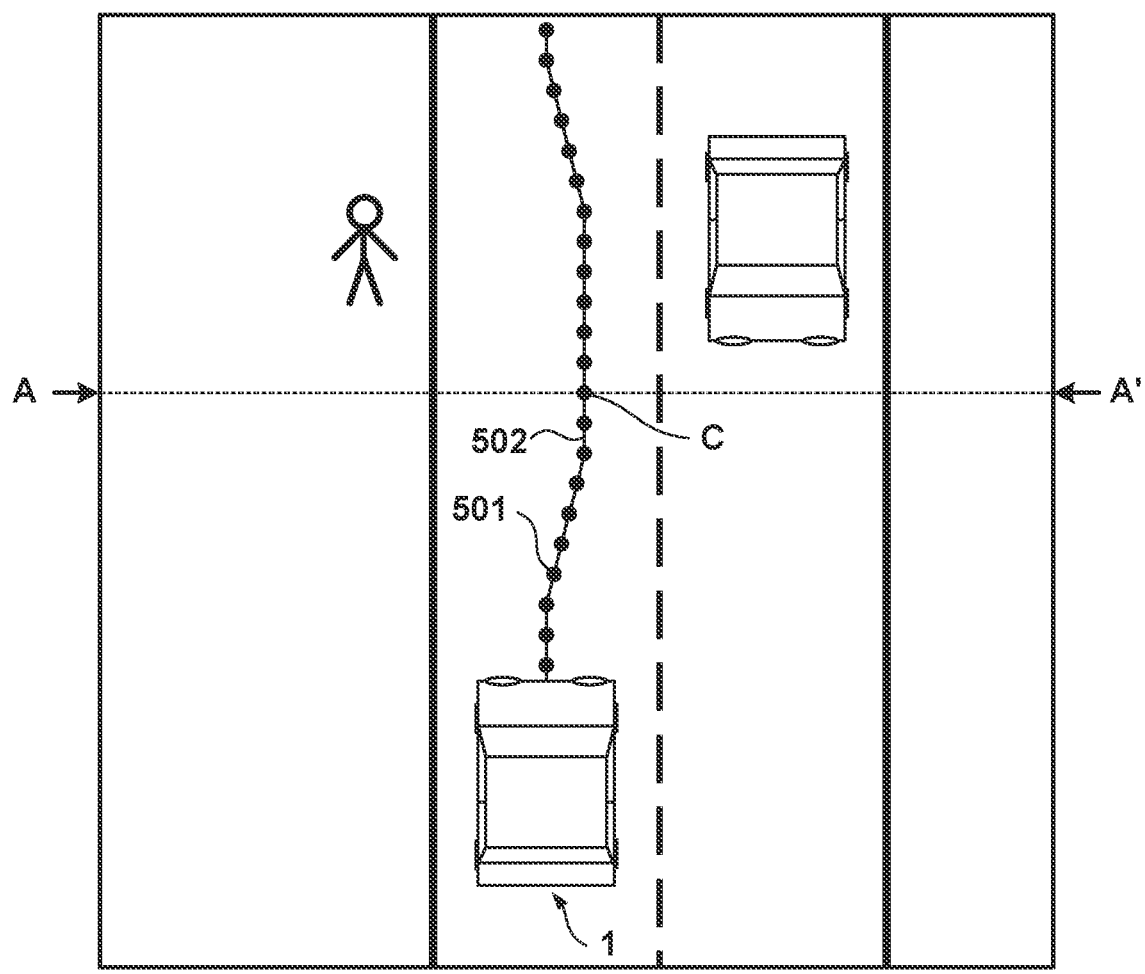
FIG. 5 is a diagram showing an example of a determined path.

The ECU 20 executes the same calculation at multiple points in time and determines a path that connects the positions selected for the points in time in chronological order. An example of this is shown in FIG. 5. At FIG. 5, a points 501 plotted in the travel direction of the vehicle 1 indicate positions at which the vehicle 1 is to be arranged, the positions being determined based on the first distribution and the second distribution as described above for multiple points in time. The position C determined in the same manner as in FIG. 4, for example, is included among the points 501. Note that the points 501 of FIG. 5 are plotted in chronological order and are higher up the farther forward in time they are. By specifying these points 501, the ECU 20 determines the path on which the vehicle 1 is to travel as a line 502 that connects these points 501.

Figure 6:
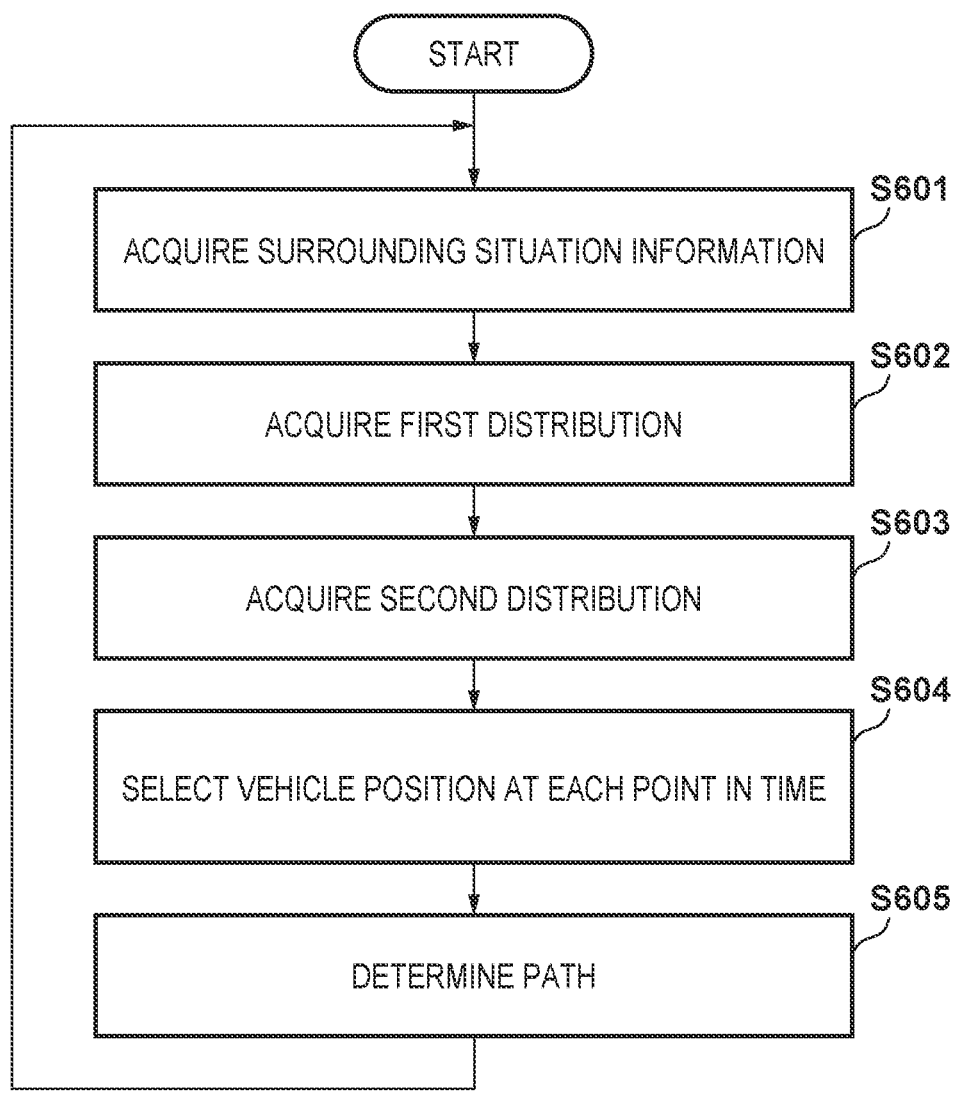
FIG. 6 is a flowchart showing an example of a flow of processing.

The above-described processing will be summarized in an overview of the flow of processing. FIG. 6 is a flowchart indicating a flow of the above-described processing. When the present processing is started, first, the ECU 20 acquires information relating to the situation in the surrounding area from the ECU 22 and 23 (step S601). At this point in time, for example, the ECU 20 acquires an image of the vehicle 1 and the situation in the surrounding area viewed from above, in which objects around the vehicle 1 are mapped. Then, based on the acquired information, the ECU 20 acquires, for multiple positions (e.g., for each pixel in the above-described images), a first distribution corresponding to the probabilities that the objects in the surrounding area will be present at a future time (step S602). Also, the ECU 20 acquires a second distribution by, for example, inputting the acquired information into an equation obtained through machine learning based on the travel data of a predetermined driver and the situation in the surrounding area of the vehicle at the time at which the data was acquired (step S603). The second distribution can be a distribution in which positions to which the vehicle is more likely to move when the predetermined driver is in the situation in the surrounding area indicated by the information acquired in step S601 have higher values. However, it should be noted that the results of the machine learning are values obtained by inputting information indicating the situation in the surrounding area into a formula and are not necessarily calculated as probability values. Note that steps S602 and S603 may also be performed in parallel and the order in which they are performed may also be reversed. Thereafter, the ECU 20 selects the positions to which the vehicle 1 is to move at multiple points in time based on the first distribution and the second distribution acquired with respect to the multiple points in time (step S604). Then, the ECU 20 determines the path along which the vehicle 1 travels by connecting, in chronological order, the positions to which the vehicle 1 is to move, which were selected for the multiple points in time (step S605). The ECU 20 repeatedly executes these series of processes and causes the vehicle 1 to travel while sequentially updating the path.

Accordingly, the path is determined with consideration given not only to the positions at which it is envisioned that the object will be present, but also to the accumulation of travel data of a predetermined driver, and therefore the probability that the path for a certain period can be determined increases. Also, this makes it possible to reduce the probability that the automated driving can no longer be continued, even in an environment in which there are many moving objects, such as an urban area. Furthermore, since the path is determined based on actions actually taken by a predetermined driver, the vehicle 1 takes actions that the predetermined driver would have taken, or actions similar thereto, with reference to the surrounding environment. As a result, natural travel corresponding to the motion of traffic participants such as pedestrians and other vehicles is performed.

Note that the ECU 20 can repeatedly acquire information relating to the situation in the surrounding area of the vehicle 1 from the ECUs 22 and 23 in short cycles, such as every 0.1 seconds, for example, and can repeatedly determine the above-described path based on the acquired information. This makes it possible to adjust the path according to changes in the situation.

Also, the ECU 20 may limit the calculation of the values relating to the second distributions to the road surface that is the region through which the vehicle 1 can pass. That is, the second distribution may be calculated for all intersection points in the grid of FIG. 3, but values relating to the second distribution may also be calculated only for intersection points included in the region between the lines 202 and 203. Note that the ECU 20 can perform calculation of values relating to the second distribution for only the target travel route. For example, if the target travel route is straight at an intersection, values relating to the second distribution need not be calculated for the regions through which the vehicle 1 passes only when performing a left or right turn. Also, the ECU 20 may further limit the range in which the values relating to the second distribution are to be calculated based on the speed and travel direction of the vehicle 1 at that point in time. For example, the values relating to the second distribution need not be calculated for the regions right beside the vehicle 1, for regions that are in the travel direction but are too far away to be reached due to the relationship between the speed and the elapsed time, and the like. This is because even if these values are calculated, the probability that the path will be set there is zero or very low. This makes it possible to reduce the complexity of processing since the number of instances of calculation relating to the second distribution can be significantly suppressed.

Note that, for example, the first distribution of a still object may be a distribution that does not suddenly become zero when the position at which the object is actually present is exceeded as viewed from the non-road side, but in which there is an edge that gradually decreases to zero in a predetermined range on the road side. Also, the first distribution of the still object may be a rectangular distribution that has a high value from the position at which the object is actually present as viewed from the non-road side to a range on the far side by a certain distance on the road side, and thereafter rapidly becomes zero. Thus, by designing the first distribution so as to have a non-zero value at the region past the position at which the still object actually exists, it is possible to prevent the vehicle 1 from coming too close to the still object.

For example, the second distribution can be specified using a model corresponding to the situations corresponding to cases such as the vehicle 1 being present on a straight road, the vehicle 1 entering an intersection, and the vehicle 1 approaching a junction or a fork in the road, for example. That is, a predetermined driver pays appropriate attention when driving the vehicle, but points to be paid attention to generally differ for each scene. For this reason, a second distribution that enables the vehicle 1 to travel suitably can be specified by updating the model for each scene. Note that, for example, multiple models are formed for an intersection model as well, such as an intersection straight-movement model, an intersection right-turn model, and an intersection left-turn model. For example, if the second distribution is specified using machine learning, learning is performed based on the travel data of a predetermined driver in various situations and on the data on the situation in the surrounding area during travelling, but this learning is performed for each model. The ECU 20 specifies the model that the vehicle 1 is to follow at that time based on the current position of the vehicle 1 and on the guide route searched for by the ECU 24, for example. Then, the ECU 20 can input information relating to the situation in the surrounding area of the vehicle 1 acquired from the ECUs 22 and 23 into a formula obtained through machine learning corresponding to the model, and thus can determine a second distribution corresponding to the model. Note that it is also possible to perform machine learning as one model for all situations without classifying the scene. However, in this case, the learning time and the calculation of the solution (specification of the second distribution) are extended. For this reason, as described above, by defining multiple scenes and specifying a model for each scene, it is possible to achieve shortening of the learning time and the time needed for specifying the second distribution.

Here, scenes may be defined for all positions, or scenes may be defined only for some regions.

In the former case, the ECU 20 can specify the position of the vehicle 1, specify the scene that is uniquely associated with that position, and determine the second distribution using a model corresponding to that scene. That is, for example, the ECU 20 specifies the second distribution by inputting information relating to the situation in the surrounding area of the vehicle 1 acquired from the ECUs 22 and 23 into a formula obtained through machine learning with respect to the specified scene. Accordingly, the ECU 20 can acquire the second distribution corresponding to the position of the vehicle 1.

On the other hand, in the latter case, for a region for which a scene is defined, the ECU 20 determines the second distribution by inputting information relating to the situation in the surrounding area of the vehicle 1 acquired from the ECUs 22 and 23 into a formula obtained through machine learning with respect to the scene. In contrast to this, for a region for which a scene is not defined, the ECU 20 specifies two regions for which scenes are defined, which sandwich the region. Also, the ECU 20 acquires two distributions by inputting information relating to the situation in the surrounding area of the vehicle 1 acquired from the ECUs 22 and 23 into two formulas obtained through machine learning with respect to the scenes corresponding to the two specified regions. Then, the ECU 20 determines the second distribution by combining the two acquired distributions. At this time, for example, the two acquired distributions are combined according to the distances between the vehicle 1 and the two regions for which scenes are defined.

Figure 7:
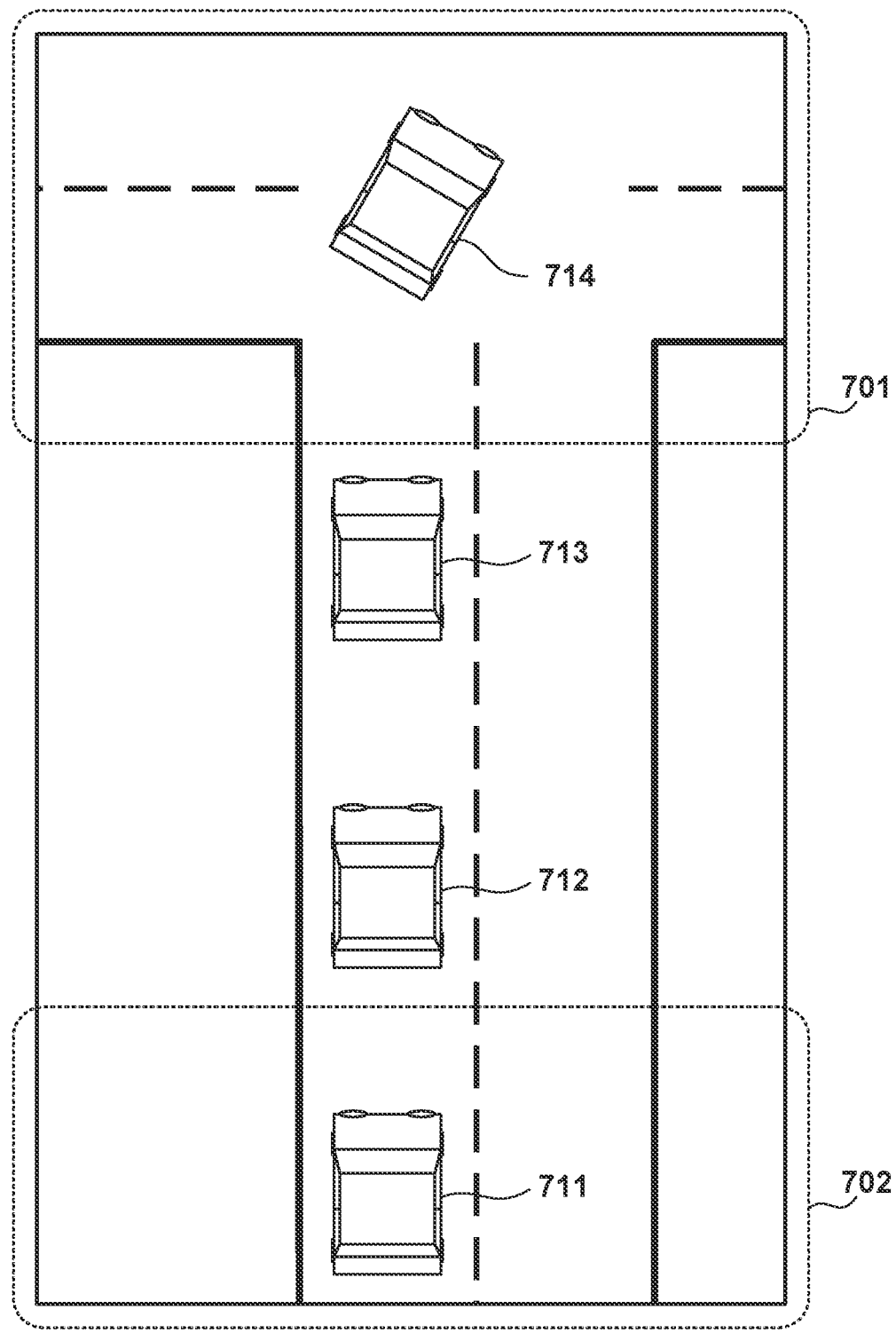
FIG. 7 is a diagram illustrating an overview of processing performed when calculating a second distribution and a relationship between a position of a vehicle and a scene.

Here, FIG. 7 will be used to describe an example of a state in which the scenes of the two regions are assumed to have been defined as a straight road and an intersection, and the vehicle 1 is moving from the straight road to the intersection. In FIG. 7, a region 701 is a region for which an intersection is defined as the scene, and a region 702 is a region for which a straight road is defined as the scene. Also, in FIG. 7, the vehicle moves from a position 711, through a position 712 and a position 713, and turns right in the intersection at a position 714. First, if the vehicle is present at the position 711, the vehicle remains in the region 702 for which the straight road scene is defined, and therefore the ECU 20 acquires the second distribution by inputting the information relating to the situation in the surrounding area of the vehicle into a formula corresponding to the model of a straight road. Thereafter, when the vehicle travels straight and reaches the position 712, since the scene is not defined at the position 712, the ECU 20 specifies the region 701 and the region 702 as two regions for which scenes are defined, and which sandwich the position 712. Then, the ECU 20 acquires one distribution by inputting information relating to the situation in the surrounding area of the vehicle into a formula corresponding to the model of the straight road, and acquires another distribution by inputting information relating to the situation in the surrounding area of the vehicle into a formula corresponding to the model of the intersection. Note that the model of the intersection is classified into an intersection straight-movement model, an intersection right-turn model, an intersection left-turn model, and the like according to the route to the destination searched for by the ECU 24, and herein, it is assumed that the intersection right-turn model is used. Thereafter, the ECU 20 acquires the second distribution by finding the weighted sum of the one distribution and the other distribution.

For example, the ECU 20 acquires the distance between the vehicle and the region 701 and the distance between the vehicle and the region 702 and performs weighting according to the distances. For example, the position 712 is close to the region 702 and far from the region 701. For this reason, weighting is performed such that the one distribution acquired based on the model of the straight road has a strong influence and the other distribution acquired based on the intersection model has a weak influence. On the other hand, the position 713 is close to the region 701 and far from the region 702. For this reason, weighting is performed such that the one distribution acquired based on the model of the straight road has a weak influence and the other distribution acquired based on the intersection model has a strong influence. For example, if the distance from the one region for which the scene is defined is x meters and the distance from the other region is y meters, a value obtained by multiplying $y/(x+y)$ by the values of the one distribution and a value obtained by multiplying $x/(x+y)$ by the values of the other distribution are added together. For example, if the distance between the region 701 and the region 702 is 100 m and the vehicle is at a position 20 m from the region 701, the second distribution is specified by multiplying the one distribution for the straight road model by 0.2 and the other distribution for the intersection model by 0.8 and adding them together. Also, if the distance between the region 701 and the region 702 is 100 m and the vehicle is at a position 90 m from the region 701, the second distribution is specified by multiplying the one distribution for the straight road model by 0.9 and the other distribution for the intersection model by 0.1 and adding them together. Accordingly, with a simple configuration, the distribution for the intersection model can gradually be made dominant starting from the state in which the distribution for the straight road model is dominant, in accordance with the vehicle approaching the intersection. This makes it possible to prevent control from becoming unstable when switching between two scenes with significantly different elements to be considered in the travel of the vehicle.

Note that the second distribution may also be specified by treating the two acquired distributions as probability distributions. For example, the ECU 20 specifies one distribution using the straight road model while traveling on a straight road and determines whether or not a position at which the value is not zero is included in the distribution in the range of the region 701. That is, if traveling is performed using a straight road model, it is determined whether or not there is a possibility that the vehicle will enter the region 701 for which the intersection model is defined within a predetermined period (e.g., 5 seconds). Then, if a position having a non-zero value in the one distribution is included in the range of the region 701, the ECU 20 acquires another distribution using the intersection model in the case where it is assumed that the vehicle is present at that position. Then, the ECU 20 specifies the second distribution by multiplying the values at the positions of the one distribution included in the range of the region 701 by the values of the other distribution acquired for the positions. That is, the one distribution is specified as the probability that the vehicle will enter the region 701 corresponding to the intersection model, and the other distribution is specified as a conditional probability with respect to the path on which the predetermined driver travels under the condition that the vehicle is present at positions in the region 701. Thus, due to the second distribution being specified according to the travel of the vehicle, it is possible to reduce the probability that the distribution specified for the region located at a position that is significantly far away will influence the travel of the vehicle.

Note that the widths of the geographic regions corresponding to the straight road model and the intersection model can be determined according to the speed of the vehicle. For example, the width of the region can be specified according to the length of the period of time in which the vehicle can reach the center of the intersection. That is, the width of the region for which the scene is defined as the intersection can be changed according to the speed limit or the like of the straight road and the like. Accordingly, for example, the intersection model influences the second distribution from a position that is significantly far from the intersection, and thus it is possible to prevent the vehicle traveling at a relatively high speed from entering the intersection at a high speed, and to prevent a left or right turn from being performed at a high speed. Similarly, the range in which the straight road model is applied can also be determined according to the speed of the vehicle, such as the speed limit. For example, the range in which the straight road model is applied can be determined as, for example, a range in which a non-zero region of the second distribution defined according to the straight road model is not included in the region corresponding to the intersection model. That is, if the vehicle is traveling at a high speed, the non-zero region of the second distribution will increase in size to a position spaced far apart from the vehicle, but the region corresponding to the straight road model can be determined such that this region does not overlap with the region corresponding to the intersection model.

Figure 8:
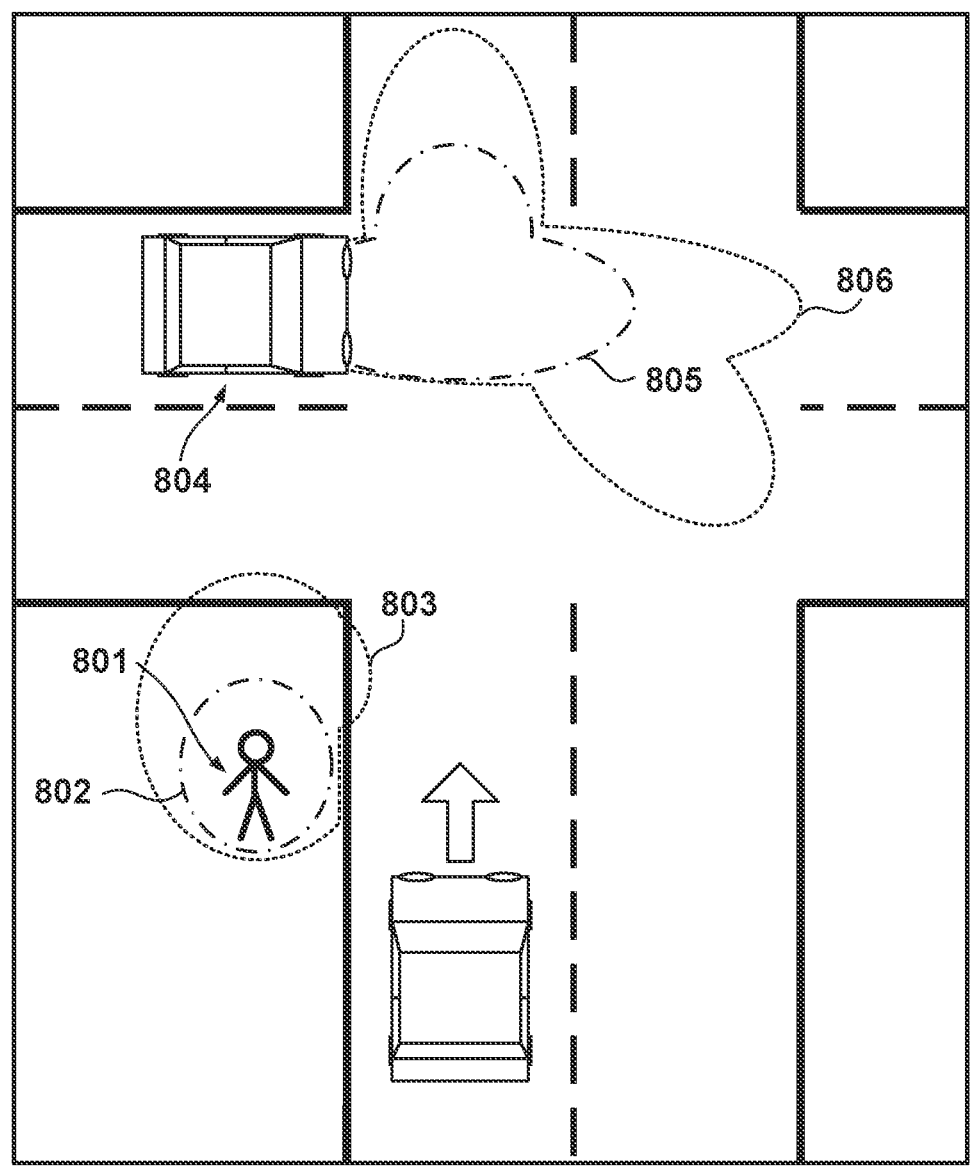
FIG. 8 is a diagram illustrating a relationship between a first distribution and a model.

Note that the first distribution can be specified using a model corresponding to a scene. This is because, for example, a pedestrian who is near an intersection and a pedestrian walking in a straight direction in a region such as a sidewalk on a straight road have different movement directions and speed tendencies, and as a result, there are cases in which it is better to change the first distribution for each scene as well. Also, if a pedestrian moves toward an intersection from the straight road, or the like, the first distribution can be specified using a combination of distributions resulting from multiple models. An example of a first model in the case of considering such a scene will be described with reference to FIG. 8. It is assumed that a pedestrian 801 is moving from the area of the straight road toward the intersection. Note that on the straight road, there is a guard rail or the like so that the pedestrian 801 cannot enter the road. At this time, in a short amount of time, a distribution 802 of the pedestrian 801 that spreads toward the intersection and does not enter in the road direction is specified as the first distribution for the pedestrian 801 using the straight road model. Thereafter, when the pedestrian 801 enters the intersection, a distribution 803 including a region entering the road is specified as the first distribution for the pedestrian 801. Also, the first distribution of the other vehicle can spread out in the forward direction as shown in FIG. 2, for example, on the straight road. On the other hand, at the intersection, the other vehicle can perform various actions such as a left turn, forward movement, or a right turn. Distributions 805 and 806 relating to the other vehicle 804 of FIG. 8 indicate these actions. At the intersection, first, the distribution 805 of the other vehicle 804 spreads out in the forward direction and the left turn direction, and thereafter, the distribution 806 can spread out in the forward direction, the left turn direction, and the right turn direction. In this manner, the first distribution can also be specified based on a scene corresponding to the positions of traffic participants. Accordingly, it is possible to more suitably evaluate the positions at which traffic participants are located.

Furthermore, for example, traffic participants with different attributes, such as pedestrians and vehicles, have significantly different movement speeds, and therefore have different widths of regions in which each traffic participant is to be considered to have entered the intersection. That is, for example, if a region in which the center of the intersection can be reached in a predetermined amount of time is used as the region in which the intersection is considered to have been entered, the vehicle has a large possible range of movement per unit time, and therefore the region is large, whereas the region corresponding to the pedestrian is smaller. In this manner, the first distribution can be specified using, for each traffic participant, a suitable model corresponding to the position at which the traffic participant is present at that time. Note that a defined model itself may also be different for each attribute of traffic participants; for example, one intersection model may be defined without defining the intersection left-turn model, the intersection right-turn model, and the intersection straight-movement model for the pedestrian. This makes it possible to more suitably evaluate the positions at which the traffic participants are located according to the attributes of the traffic participants.

Note that if there are multiple traffic participants, for example, the model is acquired by adding together first distributions calculated for each of the traffic participants (the first distributions may be averaged or weighted and added together), or by finding the maximum value at each position.

Note that the model used to specify the first distribution and the model used to specify the second distribution are set separately. That is, for example, the first distribution may be specified using the straight model as with the distribution 802 obtained when the pedestrian 801 in FIG. 8 has not reached the intersection, and the second distribution may be specified using the intersection model. In this manner, the first distribution is specified independent of the specification of the second distribution, that is, the first distribution is specified independent of the position of the vehicle 1 and the like. Also, the second distribution is specified independent of the specification of the first distribution, that is, the second distribution is specified independent of the positions of the traffic participants and the like. Accordingly, distributions for the traffic participants and the vehicle can be specified suitably.

In the present embodiment, a case was described in which the straight road model and the intersection model are used as models, but there is no limitation to this. For example, various models, such as a lane change model, a fork model, a junction model, a curve model, a highway/main road model, and an urban area model can be specified. Note that the curve model may also be determined for each region of curvature, for example. That is, separate models may also be defined for each range of values of curvature. Also, even if roads have the same shape, models for each time, and models for each kind of weather and road condition may also be defined. This makes it possible to specify a distribution corresponding to a situation even if the accuracy or the like of recognizing the surrounding environment changes according to the situation. Also, a model corresponding to the number of traffic participants may be defined for the first distribution. That is, a traffic participant on a congested road and a traffic participant on a road that is not congested have different regions in which they can move, and therefore models corresponding to the level of congestion can be defined. This makes it possible to acquire a suitable first distribution according to the situation.

Note that although it was described that the second distribution is specified based on the travel data of a predetermined driver, the "predetermined drivers" in this context may also be sorted into multiple categories. For example, categories of predetermined drivers such as drivers who tend to arrive quickly at their destinations, drivers who tend to perform fuel-efficient travel, drivers who are good at sports driving, and drivers who are good at driving in urban areas may be provided. Also, different second distributions may be selectable for each category. This can be realized by, for example, categorizing the travel data collected for each predetermined driver, and for example, preparing multiple formulas by performing machine learning based on the collected travel data. Then, for example, a passenger of the vehicle 1 inputs the driving he or she desires via an input apparatus 9 of the vehicle 1, the ECU 20 selects the category of the predetermined driver according to the input, and the ECU 20 can determine the second distribution corresponding to the selection result. Accordingly, it is possible to realize automated driving that takes into consideration the preference of the passenger of the vehicle 1.

Note that in the above description, the terms "first distribution" and "second distribution" have been used, but since "first values" and "second values" that are specified at the positions are substantively used when specifying the travel path, a "distribution" does not necessarily need to be specified.

Summary of Embodiments

1. A vehicle control apparatus of the above-described embodiment is a vehicle control apparatus configured to control automated driving of a vehicle, characterized by being configured to:

acquire information relating to a situation in a surrounding area of the vehicle, acquire, for each of a plurality of positions, a first value relating to a probability that an object present in the surrounding area will be present at a future point in time, and a second value obtained based on travel data of a predetermined driver are acquired based on the information, wherein the second values are specified using a model defined for a portion of regions through which the vehicle travels, and wherein if the vehicle travels through a region for which a model is not defined, the second values are each specified by combining two values acquired using two models defined for two regions sandwiching the position through which the vehicle is traveling, and determine a path on which the vehicle is to move, by selecting positions at which the vehicle is to be present at a plurality of future points in time from the plurality of positions, based on combinations of the first values and the second values.

According to this embodiment, a path can be determined using a suitable model according to the position of the vehicle. Also, by switching between multiple models, it is possible to achieve a reduction of the learning time and the amount of time for calculating the second values compared to the case of treating all of the situations as one model. Furthermore, it is possible to prevent control from becoming unstable in the case whether two scenes with significantly different elements to be considered in the travel of the vehicle are switched between. Also, the scenes and models no longer need to be defined at every position through which the vehicle travels.

2. The vehicle control apparatus of the above-described embodiment is characterized in that if the vehicle is traveling through a region for which no model is defined, according to distances between the vehicle and the two regions, the second values are specified as values on which values obtained using a model corresponding to the region closer to the vehicle have a greater influence than values obtained using a model corresponding to the region farther from the vehicle.

According to this embodiment, it is possible to prevent the trend of the second value from changing rapidly during a transition between different scenes, and it is possible to prevent control from becoming unstable when two scenes with significantly different elements to be considered in the travel of the vehicle are switched between.

3. The vehicle control apparatus of the above-described embodiment is characterized in that the first values are specified using a model determined according to the position of an object that is present in the surrounding area.

According to this embodiment, this makes it possible to more suitably evaluate the position at which the traffic participant is located.

4. The vehicle control apparatus of the above-described embodiment is characterized in that a model to be used when specifying the first values is determined based on an attribute and a position of an object that is present in the surrounding area.

According to this embodiment, it is possible to more suitably evaluate the position at which the traffic participant is located.

5. The vehicle control apparatus of the above-described embodiment is characterized in that the model to be used to specify the first values and the model to be used to specify the second values are set separately.

According to this embodiment, it is possible to suitably specify the first values and the second values for the traffic participant and the vehicle.

6. The vehicle control apparatus of the above-described embodiment is characterized in that the first values are specified independent of the vehicle, and the second values are specified independent of the object that is present in the surrounding area.

According to this embodiment, it is possible to suitably specify the first values and the second values for the traffic participant and the vehicle without being influenced by the processing for specifying other values.

7. The vehicle of the above-described embodiment includes the above-described vehicle control apparatus.

This makes it possible to execute appropriate control in real time by rapidly executing the above-described processing inside of the vehicle.

8. A method of the above-described embodiment is characterized by including:

acquiring information relating to a situation in a surrounding area of the vehicle;

acquiring, for each of a plurality of positions, a first value relating to a probability that an object present in the surrounding area will be present at a future point in time, and a second value obtained based on travel data of a predetermined driver, based on the information, wherein the second values are specified using a model defined for a portion of regions through which the vehicle travels, and wherein if the vehicle travels through a region for which a model is not defined, the second values are each specified by combining two values acquired using two models defined for two regions sandwiching the position through which the vehicle is traveling, and determining a path on which the vehicle is to move, by selecting positions at which the vehicle is to be present at a plurality of future points in time from the plurality of positions, based on a combination of the first values and the second values.

According to this embodiment, a path can be determined using a suitable model according to the position of the vehicle. Also, by switching between multiple models, it is possible to achieve a reduction of the learning time and the amount of time for calculating the second values compared to the case of treating all of the situations as one model. Furthermore, it is possible to prevent control from becoming unstable in the case where two scenes with significantly different elements to be considered in the travel of the vehicle are switched between. Also, the scenes and models no longer need to be defined at every position through which the vehicle travels.

According to the present invention, a suitable path can be determined according to a situation, in an automated driving vehicle.

The present invention is not limited to the above embodiment, and may be changed and modified in various ways without departing from the spirit and the scope of the present invention. Therefore, to apprise the public of the scope of the present invention, the following claims are made.

What is claimed is:

1. A vehicle control apparatus configured to control automated driving of a vehicle, wherein the vehicle control apparatus is configured to:

acquire information relating to a situation in a surrounding area of the vehicle, acquire, for each of a plurality of positions, a first value relating to a probability that an object present in the surrounding area will be present at a future point in time, and a second value obtained based on travel data of a predetermined driver based on the acquired information, wherein the second values are specified by inputting the acquired information into a function that was predefined based on driving data obtained when the predetermined driver drove another vehicle and based on surrounding environment information obtained in the driving of the other vehicle, and the second values are values each related to probability that the predetermined driver causes the other vehicle to move the each of the plurality of positions under an assumption that the predetermined driver experiences an environment corresponding to the acquired information, and wherein if the vehicle travels through an area for which the function is not defined, the second values are each specified by combining two values obtained by inputting the acquired information into the two functions that were predefined for two areas sandwiching the position through which the vehicle is traveling, determine a path on which the vehicle is to move based on combinations of the first values and the second values, and control a travel of the vehicle along the determined path by way of automated driving of the vehicle.

2. The vehicle control apparatus according to claim 1, wherein if the vehicle is traveling through an area for which no function was predefined, according to distances between the vehicle and the two areas, the second values are specified as values on which values obtained by inputting the acquired information into the function corresponding to an area of the two areas that is closer to the vehicle have a greater influence than values obtained by inputting the acquired information into the function corresponding to an area of the two areas that is farther from the vehicle.

3. The vehicle control apparatus according to claim 1, wherein the first values are specified based on an area in which the object that is present in the surrounding area can move from the current position of the object.

4. The vehicle control apparatus according to claim 3, wherein a function to be used when specifying the first values is determined based on an attribute and a position of the object that is present in the surrounding area.

5. The vehicle control apparatus according to claim 3, wherein a function to be used to specify the first values and the function to be used to specify the second values are set separately.

6. The vehicle control apparatus according to claim 1, wherein
the first values are specified independent of the vehicle, and
the second values are specified independent of the object that is present in the surrounding area.

7. The vehicle control apparatus according to claim 1, wherein the vehicle control apparatus determines a path on which the vehicle is to move, by selecting positions at which the vehicle is to be present at a plurality of future points in time from the plurality of positions, based on a combination of the first values and the second values.

8. A vehicle including a vehicle control apparatus configured to control automated driving of a vehicle, wherein the vehicle control apparatus is configured to:

acquire information relating to a situation in a surrounding area of the vehicle, acquire, for each of a plurality of positions, a first value relating to a probability that an object present in the surrounding area will be present at a future point in time, and a second value obtained based on travel data of a predetermined driver based on the acquired information, wherein the second values are specified by inputting the acquired information into a function that was predefined based on driving data obtained when the predetermined driver drove another vehicle and based on surrounding environment information obtained in the driving of the other vehicle, and the second values are values each related to probability that the predetermined driver causes the other vehicle to move the each of the plurality of positions under an assumption that the predetermined driver experiences an environment corresponding to the acquired information, and wherein if the vehicle travels through an area for which the function is not defined, the second values are each specified by combining two values obtained by inputting the acquired information into the two functions that were predefined for two areas sandwiching the position through which the vehicle is traveling, determine a path on which the vehicle is to move based on combinations of the first values and the second values, and control a travel of the vehicle along the determined path by way of automated driving of the vehicle.

9. A method to be executed by a vehicle control apparatus in order to control automated driving of a vehicle, the method comprising:

acquiring information relating to a situation in a surrounding area of the vehicle;

acquiring, for each of a plurality of positions, a first value relating to a probability that an object present in the surrounding area will be present at a future point in time, and a second value obtained based on travel data of a predetermined driver based on the acquired information, wherein the second values are specified by inputting the acquired information into a function that was predefined based on driving data obtained when the predetermined driver drove another vehicle and based on surrounding environment information obtained in the driving of the other vehicle, and the second values are values each related to probability that the predetermined driver causes the other vehicle to move the each of the plurality of positions under an assumption that the predetermined driver experiences an environment corresponding to the acquired information, and wherein if the vehicle travels through an area for which the function is not defined, the second values are each specified by combining two values obtained by inputting the acquired information into the two functions that were predefined for two areas sandwiching the position through which the vehicle is traveling, determining a path on which the vehicle is to move based on a combination of the first values and the second values, and controlling a travel of the vehicle along the determined path by way of automated driving of the vehicle.

* * * * *